United States Patent [19]

Langenstein

[11] 4,276,786
[45] Jul. 7, 1981

[54] BOOT SEAL

[75] Inventor: Joseph G. Langenstein, Edelstein, Ill.

[73] Assignee: Caterpillar Tractor Co., Peoria, Ill.

[21] Appl. No.: 127,997

[22] Filed: Dec. 5, 1979

[51] Int. Cl.³ .................. G05G 7/00; F16C 11/06; F16C 33/72

[52] U.S. Cl. .................. 74/491; 277/212 FB; 308/36.2; 308/72; 403/134

[58] Field of Search .......... 74/469, 491, 519; 277/212 FB; 308/36.1, 36.2, 72; 403/134, 288

[56] References Cited

U.S. PATENT DOCUMENTS

| 2,397,464 | 4/1946 | Booth | 287/90 |
| 2,922,670 | 1/1960 | Davies et al. | 403/134 |
| 3,030,134 | 4/1962 | Gair | 403/134 X |
| 3,343,855 | 9/1967 | Husen | 287/90 |
| 3,423,114 | 1/1969 | Gottschald | 287/87 |
| 3,547,473 | 12/1970 | Gottschald | 287/87 |
| 4,086,822 | 5/1978 | Kuroda | 74/491 X |
| 4,121,844 | 10/1978 | Nemoto et al. | 403/134 X |

*Primary Examiner*—Allan D. Herrmann
*Attorney, Agent, or Firm*—Frank L. Hart

[57] ABSTRACT

PCT No. PCT/US79/01056 Sec. 371 Date Dec. 5, 1979
Sec. 102(e) Date Dec. 5, 1979 PCT Filed Dec. 5, 1979

A boot seal (48) for sealing a swivel joint (60) having two open sides (70,72) pivotally connecting a first member (50) to a second member (42) extending transversely therethrough includes a body portion (76) enclosing the joint (60), apertures (86) in the body portion (76) for receiving the second member (42), and a flexible bellows portion (82) extending along a portion (52) of the first member (50) in sealing engagement therewith to accommodate full pivotal movement of the joint (60).

10 Claims, 2 Drawing Figures

BOOT SEAL

DESCRIPTION

1. Technical Field

This invention relates generally to seals for articulated joints and, more particularly, to boot seals for sealing swivel joints.

2. Background Art

Swivel joints provide articulated connections between two relatively movable members. Joints of this type are used in a number of applications including suspension systems and control linkage assemblies for transmissions, steering systems, and the like.

A ball joint generally includes a spherical or semi-spherical socket housing, a bearing member, and a ball stud with a spherical head seated in the socket. Often the joints are lubricated with grease. In operation, the joints are exposed to dust, dirt, and water. Accordingly, in order to retain the lubricant within the joint and to prevent the ingress of contaminants that might damage the bearing surfaces, a boot seal is usually provided. Further, because a ball joint assembly is generally designated for full pivotal movement, it is important that the seal fitted over the open end of the housing be elastically deformable to accommodate the full pivotal movement of the joint, and, yet be securely held thereon when it is deformed. This problem has been addressed by U.S. Pat. No. 4,121,844 issued to Akira Nemoto et al, Oct. 24, 1978 and U.S. Pat. No. 3,547,473 issued to Rudolf Gottschald, Dec. 15, 1970. The Nemoto reference discloses a flexible boot seal having a snap ring embedded in a flaired portion of the seal fitted onto the socket housing. Gottschald discloses a seal having a thickened beadlike ring inserted in a symmetric groove formed in the housing. Both references disclose boot seals for sealing ball joints having only one open side.

In earthmoving vehicles such as dozers and the like, linkage assemblies are used to control various operating systems of the vehicle, for example, to effect shifting of the gears in the transmission and to control the steering clutch and braking mechanisms for maneuvering the vehicle. Such linkage assemblies are often complex and include long, relatively flexible rods extending from the operator's control to the operating system. The complexity of the linkage assemblies and the length of their members leads to alignment problems during assembly of the linkage and possible inadvertent bending thereof in either assembly or operation. In addition, it is common practice to isolate the operator's compartment from the vehicle frame to minimize operator exposure to vehicle vibration and noise levels. The "floating" compartment feature further exacerbates the linkage alignment problem both during assembly of the linkage, and later because of vibrations resulting from subsequent operation of the vehicle.

The adaptation of swivel joints or spherical rod ends to interconnect control linkage members or rods has effectively addressed the alignment problem. In such instances a suitable fastener such as a pin, stud, or bolt extends outwardly from both sides of the swivel joint or rod end for fastening the linkage members together.

Since the operating environments of earthmoving vehicles involve exposure of the swivel joints to external contaminants such as dust and water, it is necessary to seal them from this environment. Here too, it is desirous to prevent entry of contaminants into both open faces of the joint to keep it from clogging up and binding, thereby rendering the link assembly inoperable. To this end, the boot seal of the present invention is positioned over the end of the linkage rods encompassing each swivel joint. A lubricant, for example, grease or a heavy oil, may be inserted therein to further assist in preventing damaging contamination of the joints.

The foregoing illustrates limitations of the known prior art. In view of the above, it would be advantageous to provide an alternative to the known prior art in the form of a boot seal for sealing a swivel joint having more than one open face.

DISCLOSURE OF THE INVENTION

In one aspect of the present invention, this is accomplished by providing a boot seal for sealing a swivel joint connecting two substantially transversely positioned members and having two open sides. Means for releasably coupling the seal to the joint assembly are included.

The foregoing and other aspects of the instant invention will become apparent from the following detailed description when considered in conjunction with the accompanying drawings. It is to be expressly understood, however, that the drawings are not intended as a definition of the invention but are for the purpose of illustration only.

BEST MODE FOR CARRYING OUT THE INVENTION

Figures 1, 2:
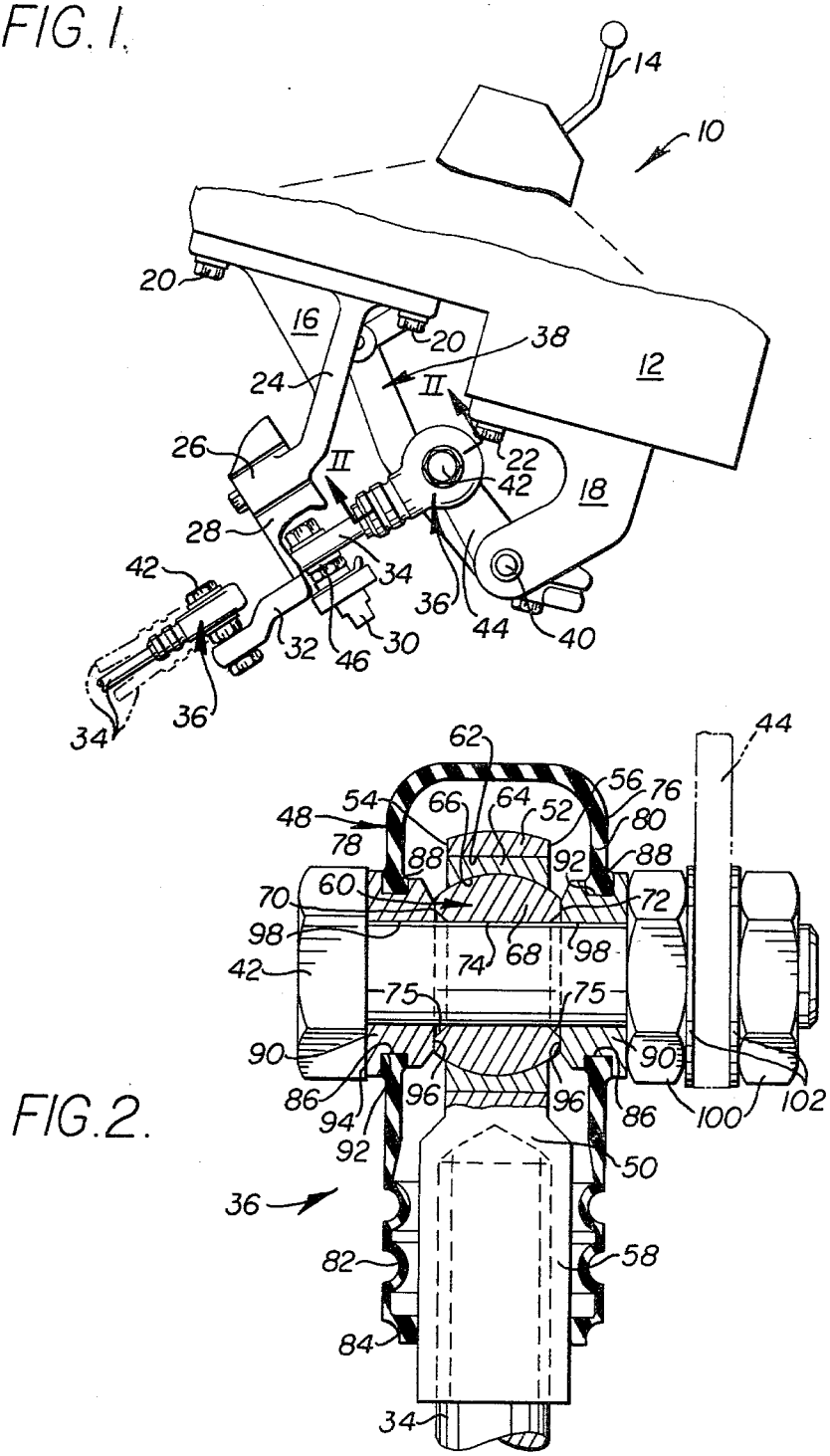
FIG. 1 is a side elevational view of a control linkage assembly embodying the present invention.
FIG. 2 is a sectional view of a preferred embodiment of the present invention taken generally along the line II—II in FIG. 1.

Referring to FIG. 1, a portion of a control linkage assembly embodying the instant invention is illustrated generally by the numeral 10. The linkage assembly includes a housing 12, a control lever 14 extending outwardly from the housing, and a first and a second bracket 16,18 bolted to the housing at 20,22 respectively.

As illustrated in the drawing, the first bracket 16 includes an outwardly extending member 24 having a sleeve or collar 26 secured thereto. A plurality of coaxially aligned bell cranks, one of which is shown at 28, are pivotally positioned along a shaft 30 disposed in the collar. Each bell crank includes an arm 32 having a linkage element or rod 34 secured thereto by a joint assembly 36.

A link assembly, shown generally by the numeral 38, is pivotally connected to the second bracket 18 at 40 and is connected to the control lever within the housing at a point not illustrated. A rod 34, including a joint assembly 36 connected by a bolt 42 to a link 44, interconnects the link assembly to the bell crank 28 and 46.

Referring now to FIG. 2, the joint assembly 36, embodying an improved boot seal shown generally by the numeral 48, is illustrated in great detail. The joint assembly includes a rod end 50 having a generally cylindrical end portion 52, flat side portions 54 and 56, and a stem 58 which is threaded onto the rod 34. A swivel joint, shown generally by the numeral 60, is pressed into a substantially transversely extending through bore 62 in the rod end and includes a bearing member 64 having a spherical bearing surface 66 and a mating ball 68. The ball includes a pair of flat, oppositely disposed, substantially parallel sides 70 and 72, and a bore 74 extending therebetween having a bevel 75 in the sides of the ball around the ends of the bore.

A flexible boot seal 48 positioned over the rod end 50 encompasses the swivel joint 60 and includes a generally cylindrically shaped body portion 76 having flat sides 78 and 80 and a flexible stem or bellows portion 82 extending along the stem 58 of the rod end. The boot seal is preferably constructed from an elastomeric material, for example rubber, and includes a flanged end 84 extending circumferentially around the rod end stem in sealing engagement therewith.

An aperture 86, including a circumferential flange 88, is formed in each of the flat sides 78 and 80 of the seal 48. An annular ferrule 90 having a groove 92 extending circumferentially about its mid portion, a pair of flat, oppositely disposed, substantially parallel sides 94,96, and a longitudinal bore 98 extending between the sides is disposed in each aperture with the circumferential flange positioned in the groove. The ferrule bores are constructed and arranged so as to be substantially coaxially aligned with one another and with the bore 74 in the ball 68. The bolt 42 extends through the ferrules and the ball and is secured to the link 44 by a pair of nuts 100 and washers 102 which, when tightened, bring the surfaces 70 and 72 of the ball into sealing engagement with the surface 96 of each ferrule.

Industrial Applicability

With the parts assembled as set forth above, the boot seal of the present invention has application wherever it is desirable to seal a swivel joint having two open sides. One such application is to seal a swivel joint or spherical rod end for pivotally connecting members of a linkage assembly for controlling the operating systems, for example, the transmission, steering, or braking mechanisms of an earthmoving vehicle.

A vehicle operating system, typically, is controlled by a movable control lever 14 secured to a housing 12 and positioned in an operator's compartment. In response to movement of the lever, a link assembly 38 is activated. Rotational movement of a link 44 of the link assembly about the pivot connection 40 is translated by a rod 34 and a joint assembly 36 connecting the link to a bell crank 28 at 46 into rotational movement of the bell crank about a shaft 30. A bell crank arm 32 translates the rotational movement of the bell crank into substantially linear movement of a rod 34 connected thereto by a joint assembly 36.

In operation of the link assembly 38, each swivel joint 60 permits rotational movement of the respective interconnected members relative to one another about a connecting bolt 42 extending substantially transversely therethrough. The swivel joints are further constructed and arranged so as to permit pivotal movement of the members with respect to one another about each joint as a result of misalignment therebetween during assembly or as a result of operational vibrations of the vehicle or inadvertent bending of the rods 34.

A flexible boot seal 48 is positioned over each swivel joint 60 for excluding foreign contaminants such as dust or water which would otherwise clog the joint and render it inoperable. The boot seal is installed over the end 50 of each rod and is secured by the bolt 42 received therein. Preferably constructed of an elastomeric material, the seal may be filled with a lubricant, for example grease or heavy oil, for lubricating the swivel joint and for further assisting in preventing the ingress of contaminants therein. In operation of the link assembly, a ferrule 90 positioned in an aperture 86 in each side 78 and 80 of the boot seal protects the seal material against damage as the members rotate relative one another, and a flexible bellows portion 82 gives the boot seal additional flexure to permit the joint its full range of pivotal motion.

While the present invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the scope thereof. Therefore, it is intended that the invention not be limited to the particular embodiments disclosed, but that the invention will include all embodiments falling within the scope of the appended claims.

I claim:

1. In a joint assembly (36) including a joint (60) for connecting a first member (50) to a second member (42) extending transversely therethrough, the first member (50) having an end portion (52), a stem (58), and first and second side portions (54,56), the improvement comprising:
    a boot seal (48) encompassing the joint assembly (36), the seal (48) including a cylindrically shaped body portion (76) disposed over the end (52) of the first member (50), a flexible portion (82) extending along the stem (58), a plurality of apertures (86) in the body portion (76) positioned adjacent the first and second sides (54,56) for receiving the second member (40); and
    means (42,100,102) for releasably coupling the seal (48) to the joint assembly (36).

2. The joint assembly of claim 1 wherein the seal (48) is formed from rubber.

3. The joint assembly of claim 1 further including an annular ferrule (90) positioned in each of the plurality of apertures (86).

4. The joint assembly of claim 1 wherein the joint (60) is a swivel joint (60).

5. The joint assembly of claim 4 wherein the swivel joint (60) includes a bearing (64).

6. The joint assembly of claim 1 wherein the first and second members (50,42) are pivotally interconnected.

7. The joint assembly of claim 1 wherein the flexible portion (82) is in the form of a bellows (82).

8. The joint assembly of claim 1 wherein the first member (50) is a rod end (50).

9. The joint assembly of claim 1 wherein the boot seal (48) contains lubricant.

10. A control linkage assembly comprising, in combination:
    a housing (12);
    a control lever (14) extending outwardly from the housing (12);
    a first bracket (16) secured to the housing (12);
    a plurality of substantially coaxially aligned bell cranks (28) mounted to the first bracket (16); each bell crank (28) having at least one rod end (50) secured thereto;
    a swivel joint (60) disposed in each rod end (50), each swivel joint (60) being adapted to receive means

(42) for releasably coupling the rod ends (50) to the bell cranks (28);

a boot seal (48) positioned over each rod end (50) including a flexible portion (82) extending along at least a portion of the length thereof;

a second bracket (18) secured to the housing (12); and a link assembly (38) interconnecting the second bracket (18), at least one of the bell cranks (28) and the control lever (14).

* * * * *